Aug. 12, 1952 — J. W. WILSON — 2,606,777
DISK DRIVING UNIT
Filed Oct. 10, 1949
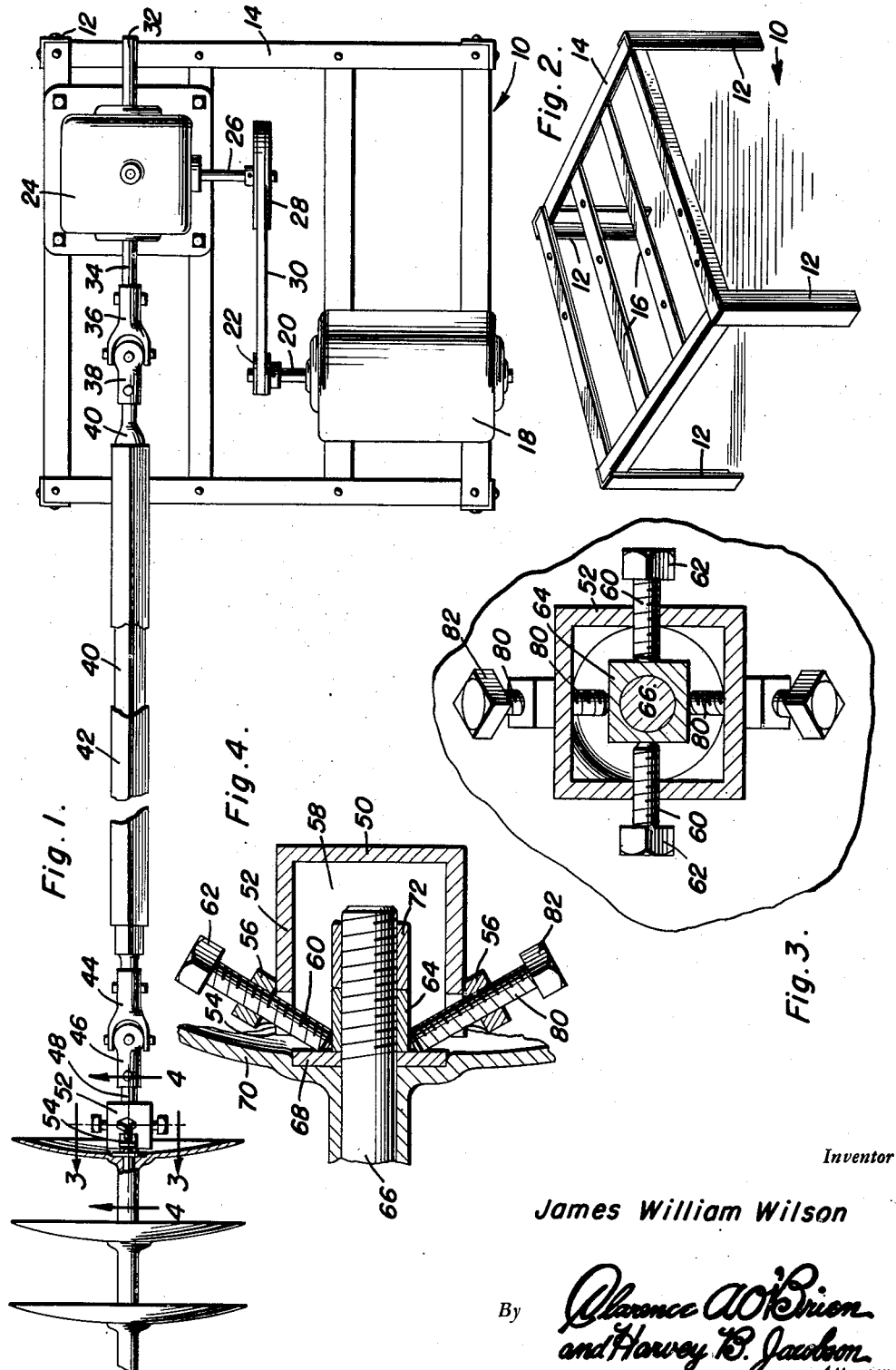
Inventor
James William Wilson Patented Aug. 12, 1952

2,606,777

UNITED STATES PATENT OFFICE 2,606,777

DISK DRIVING UNIT

James William Wilson, Harrisonville, Mo.

Application October 10, 1949, Serial No. 120,591

1 Claim. (Cl. 287—119)

This invention relates generally to farm machinery and equipment, and more particularly to novel structure for sharpening discs.

An object of this invention is to provide a disc driving unit which is highly efficient and flexible in operation so as to make the operation of sharpening discs much easier.

A further object of this invention is to provide a disc driving unit which is so flexible in operation as to eliminate the necessity of moving the unit, or the machinery on which the disc are used while still providing means for rotating the discs.

Yet another object resides in the provision of a novel structure for retaining an end of a disc shaft in direct guiding engagement with a driving shaft.

Other advantages of this invention are found in the novel disc driving unit which is simple and economical in construction, highly efficient in operation, strong, durable and relatively inexpensive to manufacture.

These, together with the various ancillary objects of the invention which will become apparent as the following description proceeds, are attained by this disc driving unit, a preferred embodiment of which has been illustrated, by way of example only, in the accompanying drawings, wherein:

Figure 1 is a top plan view of the disc driving unit comprising the present invention, parts being shown in section for greater detail;

Figure 2 is a perspective view of the supporting base on which the disc driving unit is secured;

Figure 3 is a vertical sectional view, as taken along line 3—3 in Figure 1; and

Figure 4 is a vertical sectional view as taken along line 4—4 in Figure 1 and being enlarged for greater detail.

With continuing reference to the accompanying drawings wherein like reference numerals designate similar parts throughout the various views, 10 generally represents the support member on which the disc driving unit is secured. The support 10 comprises four angle iron legs 12 to which is welded or elsewise connected an angle iron frame 14. Additional cross bars 16 are also secured for strengthening the structure and for supporting the disc driving unit.

An electric motor 18 is bolted or elsewise secured to the support 10. At one end of the drive shaft 20 of the electric motor is secured a pulley wheel 22. A gear reducer 24 is bolted to the support 10 and has a shaft 26 with a pulley wheel 28 thereon. A V-belt 30 is preferably used to connect the pulley 22 with the pulley 28. Obviously, it is of an advantage to have the pulley wheel 22 of less diameter than the pulley wheel 28 so that the speed of the shaft 26 may be somewhat reduced.

A shaft having ends 32 and 34 extending without the gear reducer 24 is driven through the suitable gears in the gear reducer at a somewhat lower rate of speed than the shaft 26. A sleeve 36 is provided which is adapted to be selectively indoor bolted to the shaft ends 32 or 34 and which together with member 38 forms a universal coupling for rotation of the connecting rod 40. The connecting rod 40 is of substantially square cross section and a reinforcing tubular sleeve, also of square cross section is secured over the rod 40.

Coupling members 44 and 46 having a universal joint therebetween are secured to the connecting rod 40 and one end of a shaft 48 respectively. Secured to the other end of the shaft 48 is a back plate 50 of substantially square shape to which is secured a square tube 52. The tube is provided with a plurality of recesses 54. Secured to the tube 52 are angularly disposed internally threaded nuts 56. Threadedly engaged within the nuts 56 and extending through the recesses 56 into the hollow interior 58 formed between the plate 50 and the tube 52 are clamping screws 60 each having square heads 62.

The screws 60 selectively engage a square nut 64 which is threadedly engaged on the disc shaft 66. The nut is rotated until it abuts against stop plate 68 abutting the disk 70, as is best shown in Figure 4. A lock nut 72 may be placed upon the shaft 66 to hold the nut 64 more rigidly.

A pair of screws 80 having square heads 82 are threaded through nuts 56 into the hollow interior 58. These nuts abut against stop plate 68 to brace the stop plate relative to the square nuts 64.

The disc driving unit of the present invention, because of its flexibility due to the universal joints between members will reduce the time necessary to grind and sharpen discs of harrows and the like since it will be unnecessary to remove the discs from the disc shaft and the discs may be kept in the frame intact. Accordingly, since the disc shafts may be arranged as desired in the harrow, sometimes in V-shape, sometimes in parallel rows, or in any other configuration, the drive unit may be rotated so as to enable any of the disc shafts to be selectively rotated. As can be readily seen, the collar 36 may be put on either end 32 or 34 of the shaft through the gear reducer 24 so that the device is yet more flexible.

Since from the foregoing, the construction and advantages of this driving unit are readily apparent, further description is believed to be unnecessary. However since numerous modifications will readily occur to those skilled in the art after a consideration of the foregoing specification and accompanying drawings, it is not intended to limit the invention to the precise embodiment of disc driving unit shown and described, but all suitable modifications and equivalents may be resorted to which lie within the scope of the appended claim.

Having described the invention, what is claimed as new is:

A driving arrangement for sharpening discs comprising a shaft, a plate secured to said shaft, a tube secured to said plate, a plurality of radially spaced openings in said tube, a plurality of nuts having threaded apertures therethrough secured to said tube with said apertures in alignment with said openings, the axis of said apertures extending at an acute angle with respect to the axis of said tube, and a plurality of angularly disposed spaced screw clamps threadedly engaged with said nuts and extending inwardly toward the center of the tube and away from said plate for selectively engaging a disc shaft, a stop plate on said disc shaft, said disc shaft having a disc mounted thereon, a square nut threadedly engaged on said disc shaft, said screw clamps abutting said stop plate to brace said stop plate relative to said square nut and to hold said stop plate in locking engagement with said disc.

JAMES WILLIAM WILSON.

REFERENCES CITED

The following references are of record in the file of this patent:

UNITED STATES PATENTS

| Number | Name | Date |
|---|---|---|
| 523,893 | Houck | July 31, 1894 |
| 836,376 | Fancher | Nov. 20, 1906 |
| 1,896,901 | Knapp et al. | Feb. 7, 1933 |
| 1,950,207 | Anderson | Mar. 6, 1934 |
| 1,958,817 | Gase | May 15, 1934 |
| 2,489,864 | Cravener | Nov. 29, 1949 |
| 2,516,709 | Lustenberger | July 25, 1950 |